Patented Mar. 7, 1944

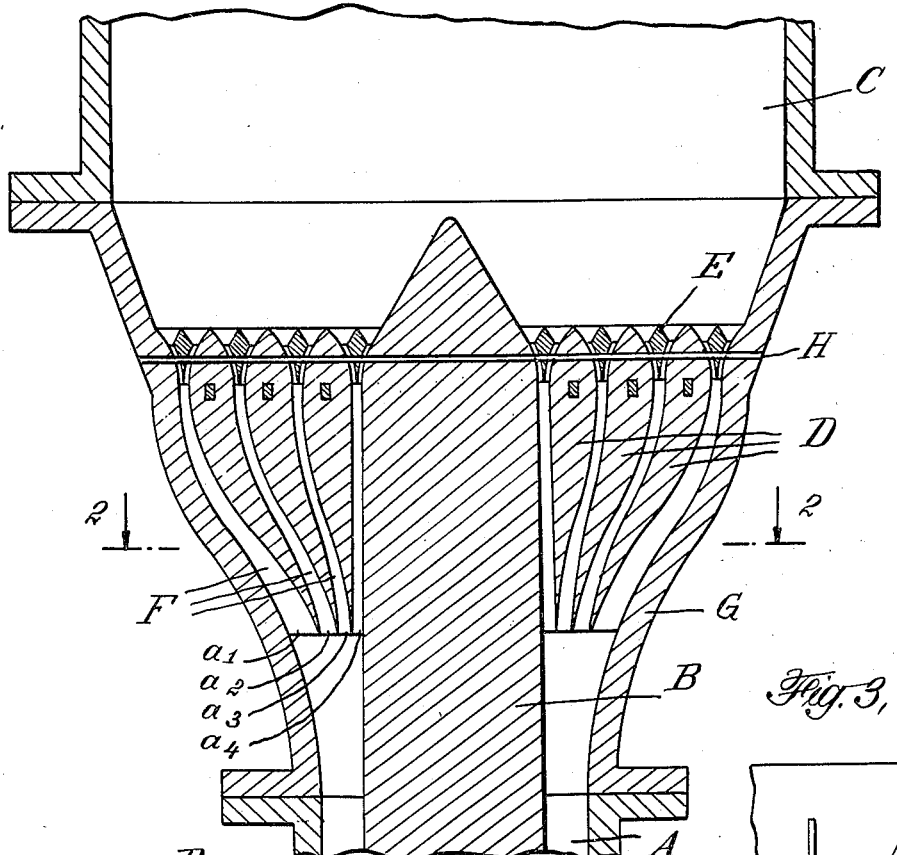
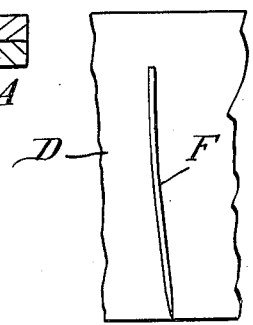
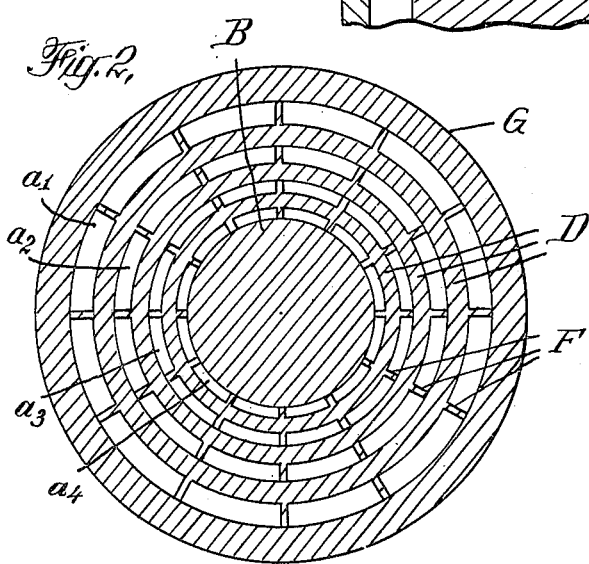

2,343,560

UNITED STATES PATENT OFFICE 2,343,560

DISTRIBUTOR FOR FLUIDS

Hans Klein, Mannheim, Otto Hemmann and Rudolf Keinke, Leuna, and Oskar Hofmann and Wilhelm Boehmer, Halle-on-the-Saale, Germany; vested in the Alien Property Custodian Application June 10, 1941, Serial No. 397,272
In Germany June 15, 1940

4 Claims. (Cl. 138—37)

The present invention relates to an apparatus for the introduction of fluids, i. e., gases, vapors or liquids, into enlarged spaces.

In many industrial processes it is necessary that gaseous, vaporous or liquid materials be passed through a supply pipe into enlarged spaces to be subjected therein, for example, to a reaction, purification or decomposition, or used for feeding a flame. While it is not harmful and may even be desirable in many cases if the speed of flow of the materials to be introduced is diminished before their entry into the enlarged space, the speed of flow must be decreased only slightly and preferably not at all, or the speed of flow must even be increased in other cases to prevent undesired reactions or ignitions occurring before the reaction chamber. This is especially difficult to accomplish if the gases or liquids, in entering the enlarged vessel, are to be uniformly distributed over its whole cross-sectional area. In the apparatus hitherto used the speed of flow is considerably diminished at the place where the supply pipe is joined to the enlarged vessel by a funnel-shaped connecting tube.

We have now found that a reduction of the speed of flow can be avoided and the gases, vapors or liquids can be uniformly distributed over the whole cross-sectional area of the enlarged reaction chamber by arranging in the funnel-shaped tube, which connects the supply-pipe with the enlarged reaction chamber, a distributor comprising a plurality of annular channels of such a cross-section that the total free cross-section of the channels at any point is approximately equal with the cross-section of the supply pipe, the cross-section of the different channels being so proportioned to one another as to effect a uniform distribution of the gases, vapors or liquids over the whole cross-sectional area of the enlarged vessel. For this purpose, the annular channels are so proportioned in diameter that they are largest in the outer zone but become increasingly more narrow towards the middle.

The object of our present invention will be more fully understood from the following description when read with reference to the accompanying drawing which diagrammatically illustrates, by way of example, a distributor of the type designed for use in the conversion of gases. In the drawing, Fig. 1 is a cross section along the longitudinal axis of the distributor; Fig. 2 is a section taken on the line 2—2 of Fig. 1; and Fig. 3 is a broken away detail showing one of the connection ribs.

In the supply pipe A the rod-shaped displacer body B is so arranged that its conical end extends through the funnel shaped tube G connecting the supply pipe A with the reaction chamber C, and projects into the enlarged reaction chamber C. The gas-mixture to be reacted in chamber C flows through the annular free space of the tube G into the channels $a_1$, $a_2$, $a_3$ and $a_4$ of the distributor. In proportion as the tube G widens, the channels are decreased in diameter so that the free cross-sectional area of the total of the channels is kept unchanged and the speed of flow of the gases is but little diminished. For constricting the channels in the said manner the partition walls D and the connection ribs F (see Fig. 2) which keep the latter at the desired distance from each other, have proper shapes, for example the shape of an inverted stream-lined body.

In order to ensure a uniform distribution of the gas over the whole cross-sectional area of the reaction chamber, the channels become smaller in width from the outer channel inwards, viz. from $a_1$ to $a_4$, so that channel $a_1$, being largest in diameter, also allows the greatest volume of gas to pass.

In the funnel-shaped openings of the channels displacer bodies E are inserted to provide for another splitting of the current of gas passing through each channel. If the gases flowing through the annular space formed by A and B describe a helical path, as easily occurs, they are axially aligned by the distributor system according to our invention. In order to assist this alignment it is preferable to make the lower ends of the connection ribs F between the partition walls D blade-shaped and to direct the ends of the blades towards the flow of the materials as shown in Fig. 3.

To prevent the flowing materials from forming whirls they should not, by the walls of the channels or the connecting ribs, be deviated by more than about 6° from the axial direction.

The distributor may, depending on the materials with which it is to be contacted in use, be made of a variety of materials, for example of iron or other metals, wood or ceramic material. When made of the latter material the annular partition walls can be formed from moulded material and the ribs provided between the walls so shaped that the distributor may be assembled ring by ring, and held in assembled relationship by suitable means, for instance, the pin H. In this case the ribs are preferably divided and the upper parts thereof made integral with the annular parts of the walls.

All those parts of the distributor contacting the streaming materials are made as smooth as possible, using, for example, glazed brick, so as to avoid whirls and similar troubles in the streaming material.

Distributors in accordance with our present invention may be used for cold or hot gases, vapors or liquids. Their exit area may be in any direction. When turned upwards it may serve at the same time for a grate, for example for filler bodies or catalysts. The distributors are especially suited for apparatus in which gases, for example hydrocarbons, are to be reacted with other gases, for example oxygen or chlorine. In all these cases it is necessary to prevent that the speed of flow of the gases, on passing to the enlarged reaction chamber, be markedly diminished, in order to avoid troubles, for example undesired reactions or ignitions.

What we claim is:

1. In a distributor for fluids, the combination with a fluid supply pipe and an enlarged chamber with which said supply pipe communicates, of a funnel shaped tube connecting said supply pipe and said enlarged chamber, a central cylindrical core in said funnel shaped tube, defining a flaring annular opening, a plurality of spaced apart, concentric, annular partition members arranged within said annular opening and defining a plurality of annular concentric channels for the passage of fluid, said annular partitions being so shaped that at any point the total free cross-sectional area of said channels defined thereby is approximately equal with the cross-sectional area of the supply pipe, whereby the rate of flow of fluid through said channels is approximately the same as the rate of flow through said supply pipe; and said annular partition members being so shaped that the cross-sectional area of the different channels are so proportioned to one another that equal amounts of fluid per unit of cross-sectional area flow through each channel, whereby said fluid is uniformly distributed over the whole cross-sectional area of said enlarged chamber.

2. A distributor, as specified in claim 1, in which connection ribs are arranged between said annular partition members to maintain said partitions at the desired distance from each other.

3. A distributor, as specified in claim 1, in which connection ribs are arranged between said annular partition members to maintain said partitions at the desired distance from each other and displacer bodies are inserted into the ends of the channels formed by said partition walls.

4. A distributor, as specified in claim 1, in which said annular partition members defining said channels are inverted streamlined bodies regarded in the direction of flow of the fluid.

HANS KLEIN.
OTTO HEMMANN.
RUDOLF KEINKE.
OSKAR HOFMANN.
WILHELM BOEHMER.